United States Patent [19]

Eto et al.

[11] Patent Number: 4,751,649

[45] Date of Patent: Jun. 14, 1988

[54] MOTOR VEHICLE WITH DRIVING STATUS DISCRIMINATION DEVICE

[75] Inventors: Kunihiko Eto, Toyota; Yutaka Mori; Akihiro Oono, both of Okazaki; Sadamu Kato, Takahama; Hideo Mizoguchi, Aichi, all of Japan

[73] Assignee: Toyoda Koki Kabushiki Kaisha, Kariya, Japan

[21] Appl. No.: 867,921

[22] Filed: May 29, 1986

[30] Foreign Application Priority Data

May 30, 1985 [JP] Japan ................ 60-117172

[51] Int. Cl.⁴ .......................... B62D 5/06; B62D 6/02
[52] U.S. Cl. .................................. 364/424; 180/142
[58] Field of Search ............... 180/132, 133, 79, 79.1, 180/79.3, 142, 141; 74/388 PS; 364/424

[56] References Cited

U.S. PATENT DOCUMENTS

| | | | |
|---|---|---|---|
| 4,437,532 | 3/1984 | Nakamura et al. | 180/142 |
| 4,473,128 | 9/1984 | Nakayama et al. | 180/142 |
| 4,574,905 | 3/1986 | Asano et al. | 180/142 |
| 4,593,358 | 6/1986 | Takeshima et al. | 180/142 X |
| 4,602,695 | 7/1986 | Takeshima et al. | 180/79 X |
| 4,606,423 | 8/1986 | Fujiwara et al. | 180/79.1 |
| 4,626,994 | 12/1986 | Yabe et al. | 180/142 X |

FOREIGN PATENT DOCUMENTS

| | | | |
|---|---|---|---|
| 149869 | 8/1984 | Japan | 180/79.1 |
| 157968 | 8/1985 | Japan | 180/79.1 |

Primary Examiner—John J. Love
Assistant Examiner—Mitchell J. Hill
Attorney, Agent, or Firm—Oblon, Fisher, Spivak, McClelland & Maier

[57] ABSTRACT

A motor vehicle is provided with a driving status discrimination device, which includes a steering angle sensor for detecting the rotational angle of a steering wheel and a microcomputer for reading and processing the steering angle signal each time the vehicle runs a predetermined distance. The microcomputer identifies one of steering angular ranges of intervals to which each detected steering angle belongs so as to record the frequency at which the steering wheel was turned to each steering angular interval. The microcomputer modifies the frequency for each steering angle interval with a weighting coefficient determined for the steering angular interval and then, calculates a total or integrated value of the modified frequencies for the steering angular intervals. Further, the microcomputer discriminates town street driving from mountain road driving based upon the integrated value so that the assisting power generated by a power steering mechanism of the motor vehicle can be controlled based upon the result of such discrimination.

11 Claims, 7 Drawing Sheets

PATTERN I

PATTERN II

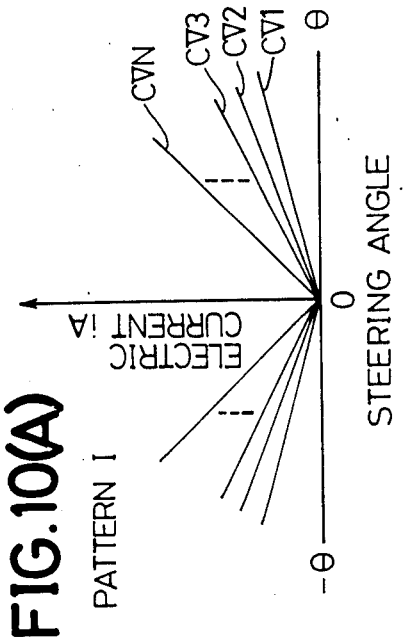
FIG.10(A) PATTERN I
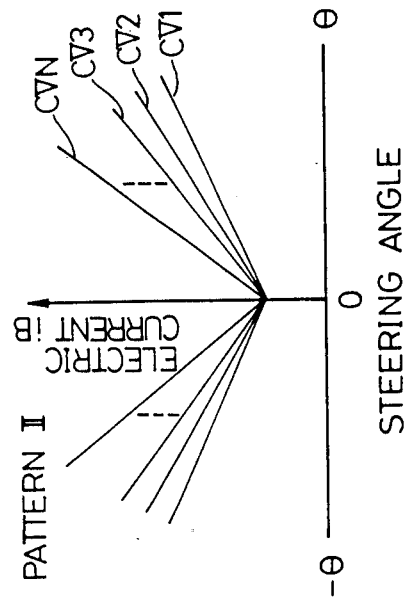
FIG.10(B) PATTERN II
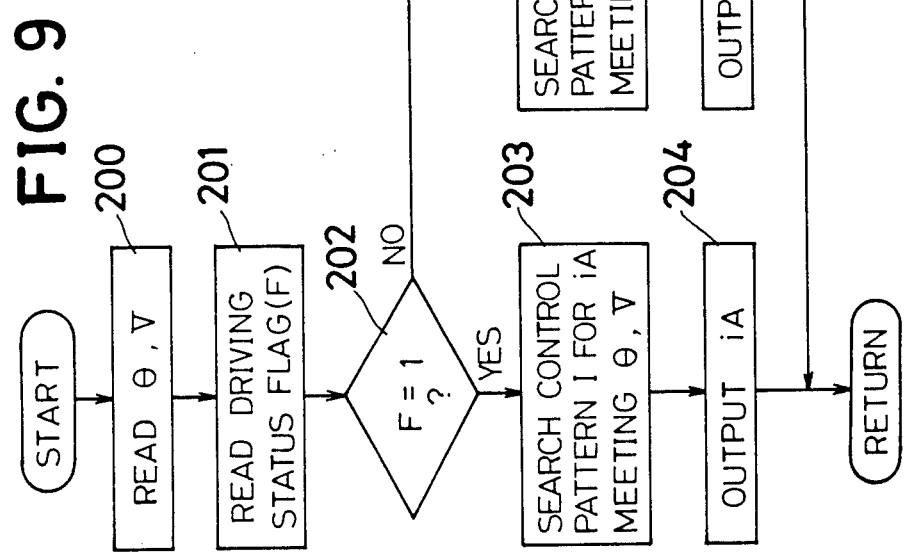
FIG. 9

MOTOR VEHICLE WITH DRIVING STATUS DISCRIMINATION DEVICE

BACKGROUND OF THE INVENTION

1. Field of the Invention

The present invention relates to a motor vehicle having a driving status discrimination device for use in controlling a power steering device, suspension mechanisms or the like in accordance with the driving status of the motor vehicle.

2. Discussion of the Prior Art

Generally, the driving status of a motor vehicle is judged based upon the vehicle speed. In a known power steering device, for example, the result of such a judgement is utilized to control the assisting power in such a manner that the steering wheel is made light during a low speed running and heavy during a high speed running.

In the prior art wherein the driving status is judged based upon the vehicle speed as described above, the assisting power control, for instance, has such a problem that the control pattern of the assisting power relative to the vehicle speed, steering angle and the like is invariable regardless of whether the vehicle runs on a mountain road or a town street, thereby making it impossible to obtain an assisting power which meet the vehicle driving status. A similar problem arises in controlling the height of a vehicle or the rigidity or shock absorption capability of suspension mechanisms.

To solve the aforementioned problem, there has been developed a steering power control system wherein a plurality of control patterns defining various assisting powers are provided to be manually selected depending upon the driver's preference or the vehicle driving status. However, the manual selection of such control patterns disadvantageously causes the vehicle driver to make a correct judgement of the driving status as well as to do a timely manipulation, and the automatic judgement of the vehicle driving status is therefore needed to obviate the drawbacks attributed to the nature of manual selection.

SUMMARY OF THE INVENTION

Accordingly, it is a primary object of the present invention to provide a motor vehicle having a driving status discrimination device capable of automatically and reliably judging the vehicle driving status.

Another object of the present invention is to provide a motor vehicle having a driving status discrimination device of the character set forth above which has a capability of distinctly discriminating a mountain road driving from a town street driving.

A further object of the present invention is to provide a driving status discrimination device of the character set forth above wherein a data analytical tool in statistics is utilized for reliable judgement of the vehicle driving status.

Briefly, a motor vehicle according to the present invention is provided with a driving status discrimination device which includes a steering angle detector for detecting the rotational angle of a steering wheel of the vehicle, a device for identifying one of steering angular ranges or intervals to which the read steering wheel angle belongs and memory means for recording the frequency at which the steering wheel was turned to each steering angular interval. A calculation device is further provided to modify frequencies of the steering wheel turns to the respective steering angular intervals by various weighting coefficients determined for the steering angular intervals and to calculates an integrated value of the modified frequencies. A judgement device compares the integrated value with a reference value so as to discriminate a driving status of the motor vehicle from another driving status.

With this configuration, the frequencies at which the steering wheel was turned to the respective angular intervals are modified by various weighting coefficients determined for the respective angular intervals. Preferably, the weighting coefficient for a medium angular interval is set to be larger than those for small and large angular intervals. Thus, mountain road driving wherein the steering wheel is turned to the medium angular interval at a large frequency can be distinctively and reliably discriminated from town street driving wherein the steering wheel is hardly turned to the medium angular interval.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of the preferred embodiments, wherein like reference numerals designate identical or corresponding parts throughout the several views, and in which.

Figure 1:
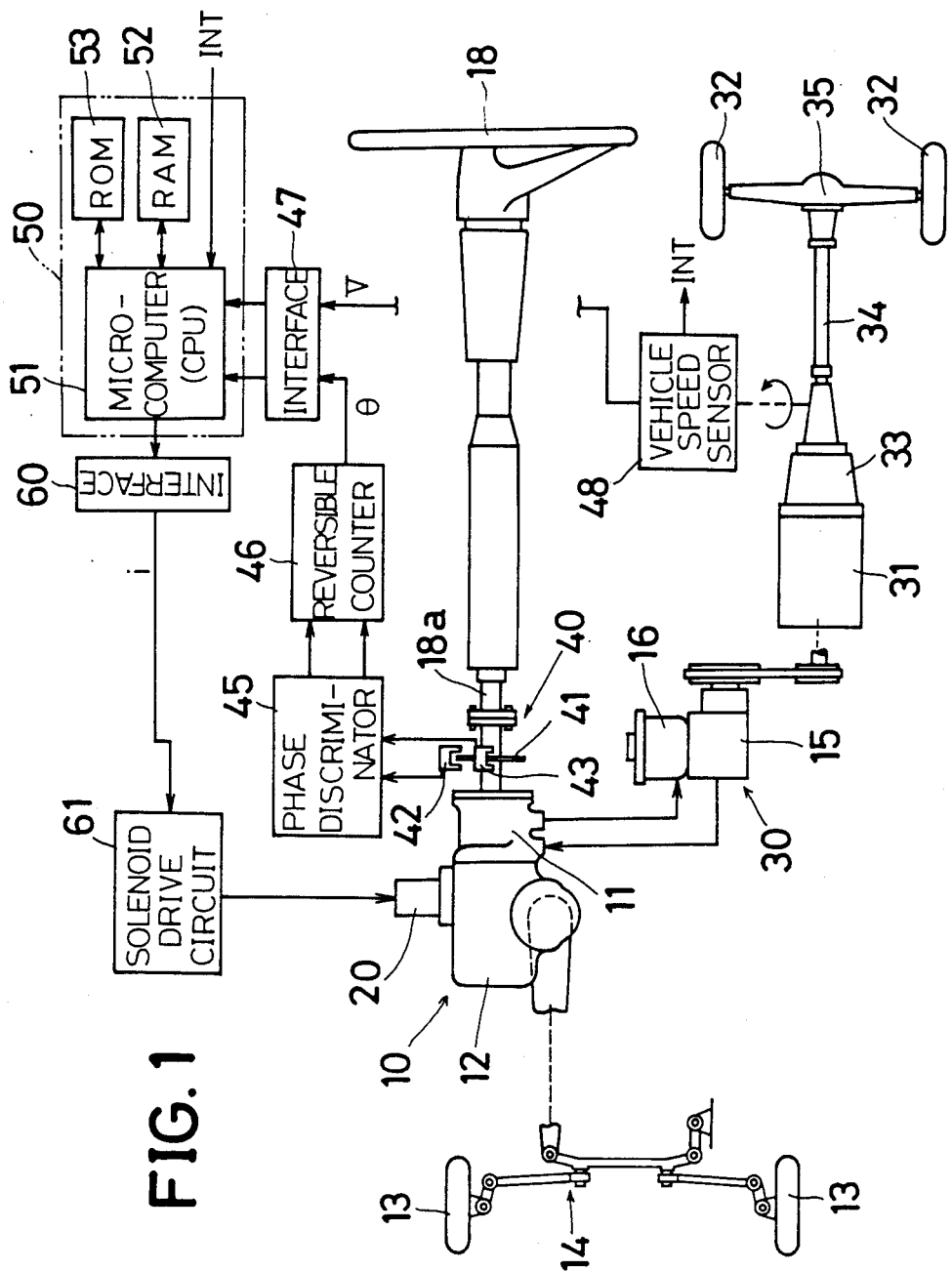
FIG. 1 is a schematic view of a motor vehicle with a power steering system according to the present invention, also showing a block diagram of an electronic controller for the power steering system.
Figure 2:
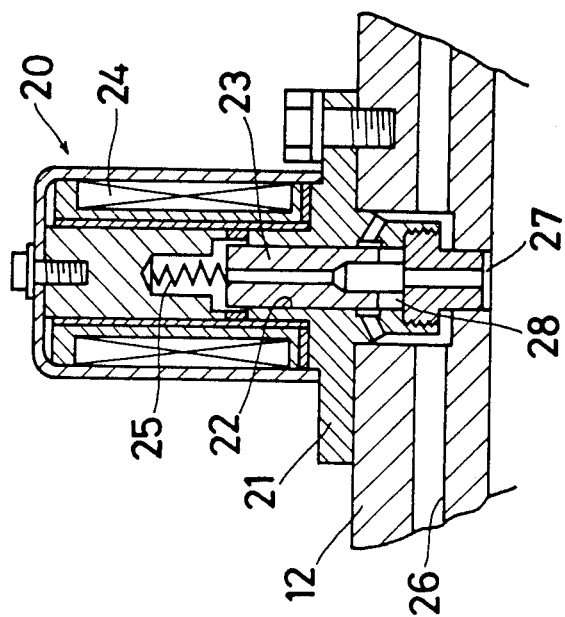
FIG. 2 is a sectional view of an electromagnetic flow control valve attached to a power cylinder 12 shown in FIG. 1.
Figure 4A:
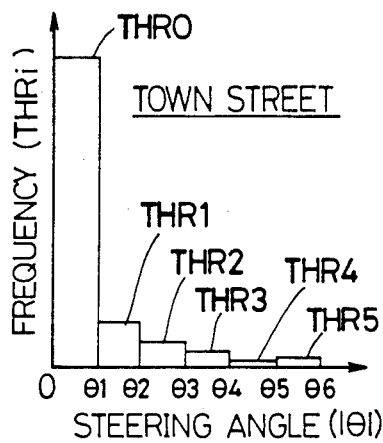
Figure 4B:
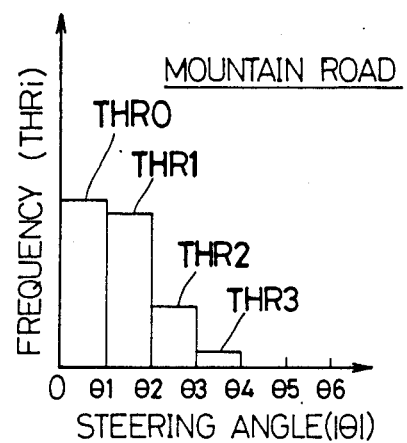
Figure 5:
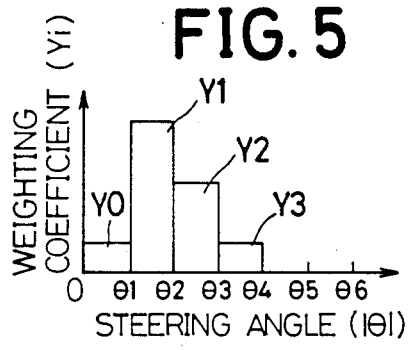
Figure 6A:
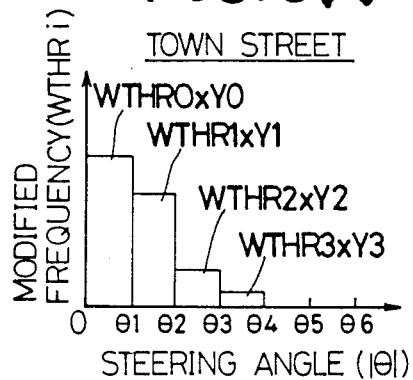
Figure 6B:
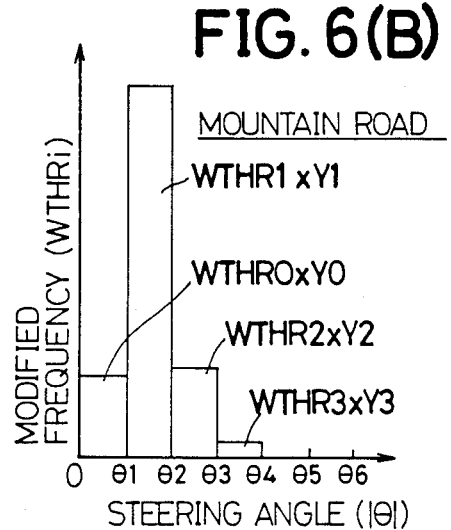
Figure 7:
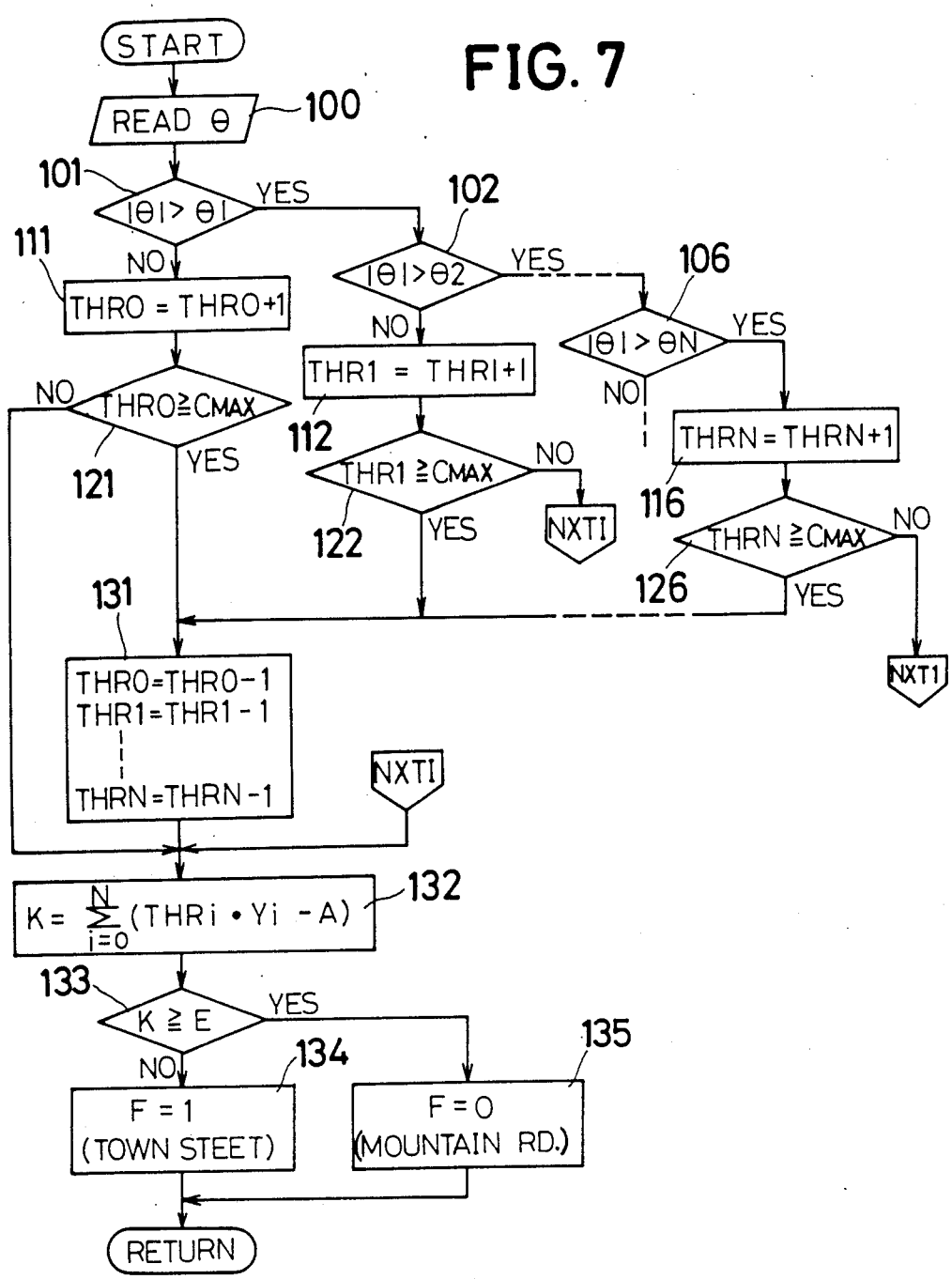
Figure 8:
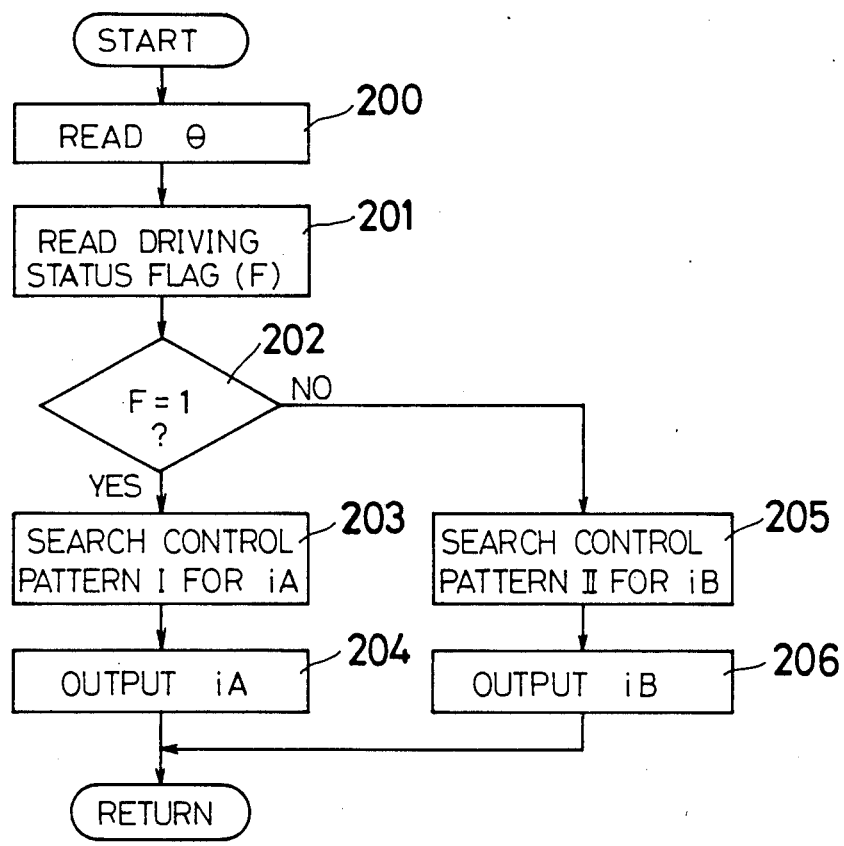
Figure 12:
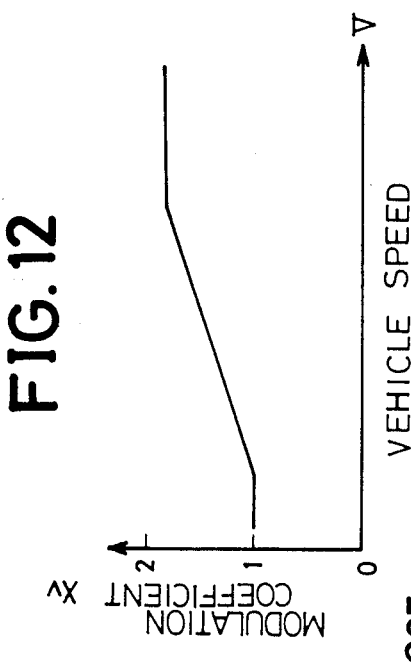
Figure 11:
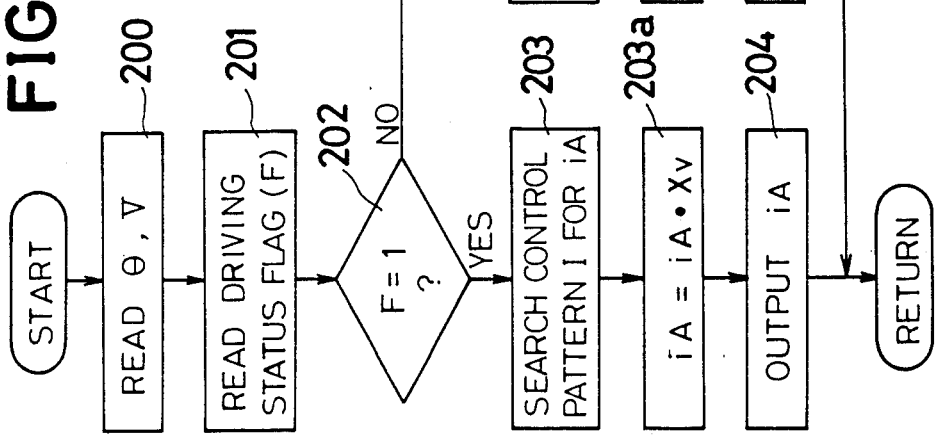

FIGS. 3 (A) and 3(B) are graphs respectively showing variations of the electric current applied to a solenoid of the flow control valve shown FIG. 2 in town street driving and mountain road driving;

FIGS. 4(A) and 4(B) are histograms respectively showing frequencies at which a steering wheel of the motor vehicle is turned to respective angular intervals in town street driving and mountain road driving;

FIG. 5 is a histogram showing various weighting coefficients determined for the respective steering angular intervals;

FIGS. 6(A) and 6(B) are histograms respectively showing frequencies to which those shown in FIGS. 4(A) and 4(B) are modified by the various weighting coefficients;

FIG. 7 is a flow chart of a driving status discrimination program executed by a microcomputer shown in FIG. 1;

FIG. 8 is a flow chart of a solenoid drive control program executed by the microcomputer;

FIG. 9 is a flow chart of another solenoid drive control program executed by the microcomputer in a second embodiment of the present invention;

FIGS. 10(A) and 10(B) are graphs respectively showing variations of electric currents applied to the solenoid valve in the second embodiment;

FIG. 11 is a flow chart of still another solenoid drive control program executed by the microcomputer in a third embodiment; and FIG. 12 is a graph showing the variation of a speed-dependent modulation coefficient used for modulating the electric current applied to the flow control valve in the third embodiment.

DETAILED DESCRIPTION OF THE PREFERRED EMBODIMENTS

Referring now to the drawings and particularly to FIG. 1 thereof, a motor vehicle according to the present invention is illustrated having a power steering system which comprises a power steering gear mechanism generally indicated at 10, a pump unit generally indicated at 30 and an assisting power controller generally indicated at 50 for controlling the assisting power generated by the steering gear mechanism 10. The assisting power controller 50 is given a function to operate as a driving status discrimination device, as described later in detail.

The steering gear mechanism 10 is composed of a servovalve 11 and a power cylinder 12. The servovalve 11 is coupled to a steering wheel 18 through a steering shaft 18a, while the power cylinder 12 is coupled to a pair of steerable front wheels 13 through link mechanisms 14. As is well known in the art, when a manual steering torque is applied to the steering wheel 18, an output steering torque increased by the power cylinder 12 is transmitted to the steerable wheels 13. The servovalve 11 is supplied with pressurized fluid from a pump 15 of the pump unit 30 which is drivingly connected to an automotive engine 31. The rotational power of the engine 31 is transmitted to another pair of rear wheels 32 through a transmission 33, an output shaft 34, a differential gear mechanism 35 and the like.

An electromagnetic flow control valve 20 is provided for controlling the bypass fluid communication between opposite chambers of the power cylinder 12 which are selectively supplied with pressurized fluid from the pump 15 through the servovalve 11, so as to control the assisting power generated by the power cylinder 12. As shown in FIG. 2 in detail, the valve 20 comprises a spool 23, which is slidably received in a hole 22 of a valve body 21, and a solenoid 24. The spool 23 is normally held by a spring 25 at its lower stroke end to discontinue the communication of passages 26, 27 which respectively lead to the opposite chambers of the power cylinder 12. However, when the solenoid 24 is energized to attract the spool 23, the same is displaced upwardly against the force of the spring 25, so that the passages 26, 27 communicate with each other through a bypass slit 28.

Referring back to FIG. 1, the electronic controller 50 is primarily composed of a microcomputer (hereafter referred to as "CPU") 51, a random access memory (hereafter referred to as "RAM") 52, and a read-only memory (hereafter referred to as "ROM") 53. The CPU 51 is coupled through an interface 60 to a solenoid drive circuit 61 for controlling electric current (i) applied to the solenoid 24 of the flow control valve 20. The CPU 51 is also coupled to a steering angle sensor 40 through an interface 47, a reversible counter 46, and a phase discrimination circuit 45. The steering angle sensor 40 comprises a rotary disc 41 secured to the steering shaft 18a and two photo interrupters 42, 43 and detects the steering angle based upon the signals from the photo interrupters 42, 43. The reversible counter 46 stores the angular position of the steering wheel 18 by incrementing its content in response to each of right-turn pulses from the phase discrimination circuit 45 and decrementing its contents in response to each of left-turn pulses from the phase discrimination circuit 45.

Further, the CPU 51 is coupled through the interface 47 to a vehicle speed sensor 48, which is drivingly connected to the output shaft 34 for detecting the vehicle speed (V). For example, the speed sensor 48 may be composed of a pulse generator rotated by the output shaft 34, a counter responsive to pulses from the pulse generator and resettable at a predetermined time interval, and a register loaded with the value of the counter prior to each resetting operation of the counter. Data in the register represents the vehicle speed (V) input to the CPU 51 through the interface 47. The pulse generator is capable of generating an interrupt signal INT each time the vehicle runs a predetermined distance (e.g., 10 meters), so as to input the interrupt signal INT to the CPU 51.

Figure 3A:
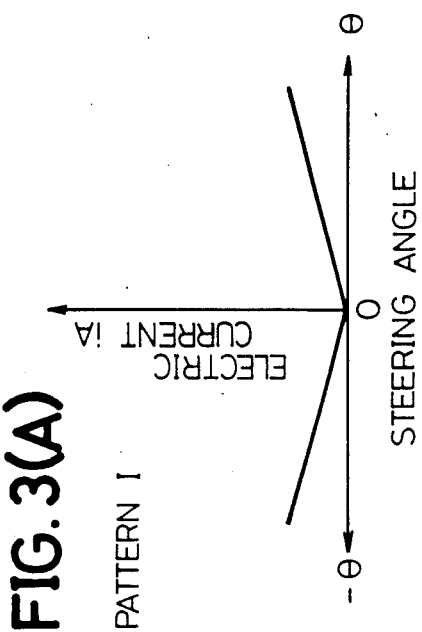
Figure 3B:
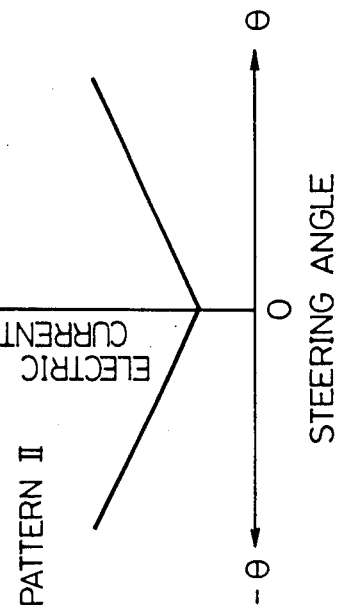

The ROM 53 stores in the form of characteristic maps two control patterns, which comprise a first control pattern I shown in FIG. 3(A) for town street driving and a second control pattern II shown in FIG. 3(B) for mountain road driving. The first control pattern I represents the variation characteristic of electric current (iA) applied to the solenoid 24 relative to the steering angle ($\theta$), and similarly, the second control pattern II represents another variation characteristic of electric current (iB) applied to the solenoind 24 relative to the steering angle ($\theta$). The variation characteristics of the electric currents (iA), (iB) are determined such that basically, the electric currents (iA), (iB) become large as the steering angle ($\theta$) increases. However, the characteristics are different in that the second control pattern II for mountain road driving is higher in the level of electric current than the first control pattern I for town street driving when the steering angle is zero (i.e., the steering wheel 18 is at its neutral position) and that the second control pattern II is larger in the variation rate of electric current relative to steering angle ($\theta$) than the first control pattern I.

Thus, in town street driving according to the first control pattern I, the variation in the required manual steering torque is made relatively small notwithstanding a large increase in the steering angle ($\theta$), thereby providing a steering characteristic suitable for town street driving in which a large angle turn of the steering wheel 18 is performed at a larger frequency. In mountain road driving according to the second control pattern II, on the other hand, another steering characteristic is obtained wherein the steering wheel 18 is made generally heavier so as to prevent the steering wheel 18 from being turned excessively, and wherein the manual steering torque required therein increases at a larger rate with increases in the steering angle ($\theta$).

The RAM 52 has a plurality of storage locations or buffer areas for respectively storing frequencies of steering wheel turns to respective steering angular ranges or intervals. The ROM 53 stores system control programs for enabling the CPU 51 to calculate an index (hereafter referred to as "driving status index K") which represents the driving status of the vehicle and then, to control electric current applied to the flow control valve 20 based upon the driving status index (K).

Each of FIGS. 4(A) and 4(B) shows the distribution of frequencies at which the steering wheel 18 was turned to respective angular intervals (e.g., O-$\theta_1$, $\theta_1$-$\theta_2$, $\theta_2$-$\theta_3$, $\theta_3$-$\theta_4$, . . . ). Town street driving represents a frequency distribution shown in FIG. 4(A) since the frequency is very large in straight driving and small in curve turn and right-angle turn. On the other hand, mountain road driving represents another frequency distribution shown in FIG. 4(B) since the frequency is not small in curve turn, but almost zero in right-angle turn.

Further, the ROM 53 stores the following weighting functional equation:

WTHRi=THRi (Yi)

where WTHRi represents a weighted frequency of each angular interval (i), THRi an actual frequency of steering wheel turns to each angular interval (i)), and Yi a weighting coefficient for each angular interval (i). The weighting functional equation is determined for providing actual frequencies (THRi) of the respective angular intervals (i) with different weights (Y0, Y1, Y2, Y3, ... ). As is clear from FIG. 5, the weighting coefficients (Yi) for angular intervals which cover small and large steering angular positions are defined to be small, while those for angular intervals which cover medium steering angular positions are defined to be large.

FIG. 6(A) exemplifies the weighted frequencies WTHRi of the respective angular intervals in town street driving, while FIG. 6(B) exemplifies the weighted frequencies WTHRi of the respective angular intervals in mountain road driving. These figures make it clear that town street driving is remarkably different from mountain road driving in a total or integrated value of the weighted frequencies.

The operation of the electronic controller 50 in discriminating the driving status of the vehicle will be described with reference to a driving status discrimination program shown in FIG. 7.

During the vehicle driving, the steering angle signal ($\theta$) which momentarily varies is detected by the steering angle sensor 40 and is input through the phase discrimination circuit 45 to the reversible counter 46. The vehicle speed (V) is detected by the vehicle speed sensor 48 and is stored in the register (not shown) provided therein.

Each time the vehicle runs a predetermined distance, the pulse generator (not shown) in the speed sensor 48 inputs an interrupt signal INT to the CPU 51. The CPU 51 executes the program shown in FIG. 7 in response to the interrupt signal INT. First of all, a steering angle ($\theta$) stored in the reversible counter 46 is read in step 100, and the absolute value ($|\theta|$) of the detected steering angle ($\theta$)is ascertained in step 101 as to whether it is larger than an angle ($\theta 1$). If the absolute value ($|\theta|$) is larger than the angle ($\theta 1$), it is ascertained in step 102 as to whether larger than another angle ($\theta 2$) or not. If "Yes" is answered, the absolute value ($|\theta|$) is in turn ascertained as to whether larger than another angle ($\theta 3$), ... ($\theta N$) or not. As an angular interval to which the detected steering angle ($\theta$) belongs is identified in this manner, "1" is added to one of the buffer areas THRO through THRN which is assigned to the identified angular interval, in a corresponding one of steps 111, 112, ... 116. Subsequently, it is ascertained in a corresponding one of steps 121, 122, ... 126 whether the value in the associated buffer area is larger than a set value CMAX. If it is smaller than the set value CMAX, step 132 is reached, wherein the driving status index (K) is calculated as described later. On the other hand, the value in the associated buffer area is equal to, or exceeds, the set value CMAX, "11" is subtracted from those in all of the buffer areas THRO through THRN in step 131 so as to prevent an of the buffer areas THRO through THRN from overflowing, and step 132 is then reached.

The calculation of the driving status index (K) is performed using the following equation.

$$K = \sum_{i=0}^{N} (THRi \ominus Yi - A)$$

That is, an index (k1) in a first angular interval (0-$\theta 1$) is calculated by multiplying the value in the buffer area (THR0) with the weighting coefficient (Y0) and by subtracting a constant (A) from the result of such multiplication. Similarly, indexes (k2 ... kN) for a second angular interval ($\theta 1$-$\theta 2$) through the last angular interval ($\theta$N-1 to $\theta$N) are in turn calculated in the same manner as above, and the calculated indexes (k1, k2, ... kN) are integrated to obtain the driving status index (K).

Step 133 is then reached to ascertain whether the calculated driving status index (K) is equal to, or larger than, a reference value (E) which has been experimentally obtained. If K$\geq$E, the vehicle is judged to be in mountain road driving, and if not K$\geq$E, it is judged to be in town street driving. Thus, if not K $\geq$E, a driving status flag (F) provided at a memory location of the RAM 52 is set to indicate "" in step 134, and if K$\geq$E, it is reset to indicate "0" in step 135.

The operation of the CPU 51 in controlling the assisting power based upon the driving status index (K) will be described hereinafter with reference to the other system control program shown in FIG. 8.

Upon completion of either of steps 134 and 135, the CPU 51 halts the execution of the routine shown in FIG. 7 until it receives the next interrupt signal INT and instead, begins to execute a solenoid drive control program shown in FIG. 8 as follows:

First of all, step 200 is executed to read the steering angle ($\theta$) which is stored in the reversible counter 46, and step 201 is then reached to read the status of the driving status flag (F). In subsequent step 202, the value in the driving status flag (F) is ascertained, wherein if F=1, the processing is advanced to steps 203 and 204, whereby the first control pattern I for town street driving in the ROM 53 are searched based upon the read steering angle ($\theta$) for an electric current (iA) so as to apply the same to the solenoid 24. If F=0 in step 202, on the contrary, the processing is advanced to steps 205 and 206, whereby the second control pattern II for mountain road driving is searched based upon the read steering angle ($\theta$) for an electric current (iB) so as to apply the same to the solenoid 24. Upon completion either of steps 204 and 206, the CPU 51 halts the execution of the routine shown in FIG. 8.

In this manner, the CPU 51 executes the above-described programs in response to an interrupt signal (INT) which is generated each time the vehicle runs a predetermined distance, whereby the assisting power generated by the power cylinder 12 is varied depending upon the driving status of the vehicle.

A second embodiment of the present invention will be described hereinafter. In this embodiment, the electric current (i) applied to the solenoid 24 of the flow control valve 20 is varied not only based upon the steering angle, but also based upon the vehicle speed (V). For this purpose, another solenoid drive control program shown in FIG. 9 is used in place of that shown in FIG. 8. Further, another set of first and second control patterns I and II shown in FIGS. 10(A) and 10(B) are used in place of those shown in FIGS. 3(A) and 3(B). In each of the control patterns I and II, a plurality of speed-dependent characteristics CV1, CV2, . . . CVN are defined. When executing the solenoid drive control program, the CPU 51 reads in step 200 the vehicle speed (V) stored in the register (not shown) of the speed sensor 48 in addition to the steering angle (θ) and in each of steps 203 and 205, searches an electric current (iA) or (iB) which is determined based upon the vehicle speed (V) and the steering angle (θ) read in step 200.

FIG. 11 shows still another solenoid drive control program used in a third embodiment. In this embodiment, a plurality of speed-dependent modulation coefficients (Xv) have been stored in the ROM 53 in advance, and steps 203a and 205a are inserted each for modifying the electric current (iA) or (iB) searched in step 203 or 205 in accordance with the following functional equation:

$$i = i \cdot Xv$$

More specifically, a steering angle (θ) and a vehicle speed (V) are read in step 200, and an electric current (iA) or (iB) which is searched by reference to the control pattern I or II in step 203 or 205 is modified in step 203a or 205a by being multiplied by one of the speed-dependent modulation coefficients (Xv) which is selected in correspondence to the vehicle speed (V) read in step 200. FIG. 12 exemplifies a characteristic map or pattern which is stored in the ROM 52 for defining the plurality of speed-dependent modulation coefficients (Xv).

The power steering mechanism used in any of the above-described embodiments is constituted by that of a so-called "ball recirculating type". However, it may be replaced by any power steering mechanism of a so-called "rack-pinion type".

Although the above-described embodiments teach several application examples wherein the result of driving status discrimination is utilized for controlling the assisting power generated by the power steering mechanism 10, such discrimination result may be utilized for the height control of a vehicle, the rigidity control of suspension mechanisms or the like.

Further, the above-described embodiments make one reference value (E) in discriminating town street driving from mountain road driving. However, a modification may be made to provide a plurality of such reference values (E) at suitable intervals. In this modified case, three or more control patterns such as those shown in FIGS. 3(A) and 3(B) may be prepared for respective intervals divided by the reference values (E) and may be selected depending upon the value of the driving status index (K). This modification is useful to avoid an abrupt change-over from the electric current (iA) selected from the first control pattern I to that selected from the second control pattern II.

Obviously, numerous modifications and variations of the present invention may be possible in light of the above teachings. It is therefore to be understood that within the scope of the appended claims, the present invention may be practiced otherwise than as specifically described herein.

What is claimed is:

1. A motor vehicle having a steering wheel manually rotatable by a driver and a driving status discrimination device for discriminating the driving status of said motor vehicle base upon rotation of said steering wheel, said driving status discrimination device comprising:
   steering angle detection means for detecting the rotational angle of said steering wheel so as to output a steering angle signal representing said detected rotaional angle;
   a plurality of storage locations respectively corresponding to a plurality of steering angular intervals of said steering wheel, each of storing a frequency at which said steering wheel is turned to a corresponding one of said steering angular intervals;
   means for incrementing one of said frequencies stored in one of said storage locations each time said steering angle detection means outputs a rotational angle signal representing one of said steering angular intervals corresponding to said one of said storage locations;
   calculation menas for modifying said frequencies stored in said storage locations with various weighting coefficients determined for said steering angular intervals, so as to provide modified frequencies having large differences in frequency between one driving status and another driving status of said motor vehicle; and
   judgement means for discriminating said one driving status of said motor vehicle from said another driving status based upon at least a part of said modified frequencies.

2. A motor vehicle as set forth in claim 1, wherein: said calculation means for calculating a driving status index by integrating all of said modified frequencies; and
   said judgement means is responsive to said driving status index calculated by said calculation means for discriminating mountain road driving as said one driving status from town street driving as said another driving status.

3. A motor vehicle as set forth in claim 2, wherein said driving status discrimination device further comprises:
   ascertaining means for ascertaining whether the frequency stored in any one of said storage locations reaches a first predetermined value; and
   subtraction means for subtracting a second predetermined value from said frequency stored in each of said storage locations each time it is ascertained by said ascertaining means that the frequency stored in any one of said storage locations reaches said first predetermined value.

4. A motor vehicle as set forth in claim 1, further comprising:
   a pair of wheels steerable through rotation of said steering wheel;
   a power steering mechanism connected to said steering wheel for generating an assisting power to rotate said steering wheel; and
   assisting power control means for controlling said assisting power generated by said power steering mechanism based upon the driving status discriminated by said judgement means.

5. A motor vehicle as set forth in claim 4, wherein said assisting power control means comprises:
   electromagnetic means responsive to an electric current applied thereto for adjusting the assisting power generated by said power steering mechanism;
   memory means for storing first and second characteristic maps each defining various electric currents respectively associated with angular positions of said steering wheel;

selector means for selecting one of said first and second characteristic maps based upon the driving status discriminated by said judgement means; and search means for searching said one of said first and second characteristic maps selected by said selector means, for an electric current associated with the steering angle detected by said steering angle detection means so as to apply the searched electric current to said electromagnetic means.

6. A motor vehicle as set forth in claim 5, wherein each of said first and second characteristic maps defines various electric currents respectively associated with angular positions of said steering wheel and driving speeds of said motor vehicle and wherein said assisting power control means further comprises:

a vehicle speed sensor for detecting the driving speed of said motor vehicle;

said search means searching said one of said first and second characteristic maps selected by said selector means, for an electric current associated with the steering angle detected by said steering angle detection means and a driving speed of said motor vehicle detected by said vehicle speed sensor so as to apply the searched electric current to said electromagnetic means.

7. A motor vehicle as set forth in claim 5, wherein said assisting power control means further comprises:

a vehicle speed sensor for detecting the driving speed of said motor vehicle; and modulation means responsive to the driving speed of said motor vehicle detected by said vehicle speed sensor for modulating said electric current searched by said search means based upon said driving speed.

8. A device for discriminating the driving status in a motor vehicle having a steering wheel manually rotatable by a driver, said device for discriminating the driving status of said motor vehicle based upon rotation of said steering wheel comprising:

steering angle detection means for detecting the rotational angle of said steering wheel so as to output a steering angle signal representing said detected rotational angle;

a plurality of storage locations respectively correponding to a plurality of steering angular intervals of said steering wheel, each for storing a frequency at which said steering wheel is turned to a corresponding one of said steering angular intervals;

means for incrementing the frequency stored in one of said storage locaitons each time said steering angle detection means outputs a rotiaional angle signal representing one of said steering angular intervals corresponding to said one of said storage locations;

calculation means for modifying the frequency stored in at least one of said storage locations with at least one weighting coefficient determined for at least one of said steering angular intervals corresponding to said at least one storage location, so as to make a large difference in the modified frequency between one driving status and another dirving status of said motor vehicle; and judgement means for discriminating said one driving status of said motor vehicle from said another driving status based upon at least said modified frequency.

9. A device as in claim 8, wherein said motor vehicle employs a power steering mechanism connected to said steering wheel of said motor vehicle for generating an assisting power to rotate said steering wheel and said device further comprises:

memory means for storing first and second characteristic maps each defining various electric currents respectively associated with angular positions of said steering wheel;

selector means for selecting one of said first and second characterisitc maps based upon the driving status discriminated by said judgement means;

search means for searching said one of said first and second characteristic maps selected by said selector means, for an electric current associated with the steering angle detected by said steering angle detection means and outputting said associated current; and electric actuator means operatively connected with said power steering mechanism and responsive to said associated current applied from said search means for adjusting the assisting power generated by said power steering mechanism.

10. A device as set forth in claim 9, wherein each of said first and second characteristic maps defines various electric currents respectively associated with angular positions of said steering wheel and driving speeds of said motor vehicle, said device further comprising:

a vehicle speed sensor for detecting the driving speed of said motor vehicle;

said search menas being capable of searching said one of said first and second characteristic maps selected by said selector means, for an electric current associated with the steering angle detected by said steering angle detection means and a driving speed of said motor vehicle detected by said vehicle speed sensor so as to apply the searched electric current to said electric actuator means.

11. A device as set forth in claim 9, further comprising:

a vehicle speed sensor for detecting the driving speed of said motor vehicle; and modulation means responsive ot the driving speed of said motor vehicle detected by said vehicle speed sensor for modulating said electric current searched for by said search means based upon said driving speed.

* * * * *